United States Patent
Singh et al.

(10) Patent No.: US 11,962,842 B1
(45) Date of Patent: Apr. 16, 2024

(54) FORMULATION AND DISPLAY OF WIRELESS CONNECTION CREDENTIALS

(71) Applicant: CSC Holdings, LLC, Bethpage, NY (US)

(72) Inventors: Maheshwar Singh, Roslyn Heights, NY (US); Rajesh Khandelwal, Princeton Junction, NJ (US); Shashank Somal, East Meadow, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

(21) Appl. No.: 17/137,948

(22) Filed: Dec. 30, 2020

(51) Int. Cl.
*H04N 21/4363* (2011.01)
*G06F 3/14* (2006.01)
*G06F 3/16* (2006.01)
*G06K 7/14* (2006.01)
*H04L 9/40* (2022.01)
*H04N 21/41* (2011.01)
*H04N 21/431* (2011.01)
*H04N 21/436* (2011.01)
*H04N 21/475* (2011.01)
*H04W 12/06* (2021.01)

(52) U.S. Cl.
CPC ......... *H04N 21/43637* (2013.01); *G06F 3/14* (2013.01); *G06F 3/167* (2013.01); *G06K 7/1417* (2013.01); *H04L 63/08* (2013.01); *H04N 21/41265* (2020.08); *H04N 21/4312* (2013.01); *H04N 21/43615* (2013.01); *H04N 21/4753* (2013.01); *H04W 12/06* (2013.01)

(58) Field of Classification Search
CPC ....... H04N 21/43637; H04N 21/41625; H04N 21/4312; H04N 21/43615; H04N 21/4753; H04W 12/06; G06F 3/14; G06F 3/167; G06K 7/1417; H04L 63/08
See application file for complete search history.

(56) References Cited

U.S. PATENT DOCUMENTS

| | | | |
|---|---|---|---|
| 2008/0155668 A1* | 6/2008 | Arashin | H04N 21/4181 726/6 |
| 2009/0289764 A1* | 11/2009 | Chiu | H04Q 9/00 340/10.1 |
| 2011/0210171 A1* | 9/2011 | Brown | H04L 63/083 235/382 |
| 2014/0282924 A1* | 9/2014 | Singhal | H04L 63/0853 726/5 |

(Continued)

*Primary Examiner* — Chenea Davis
(74) *Attorney, Agent, or Firm* — Sterne, Kessler, Goldstein & Fox P.L.L.C.

(57) ABSTRACT

Customers at a premises attempting to connect a new wireless device, such as a mobile phone or tablet to an available wireless network (Wi-Fi), receive network login information such as an Wi-Fi SSID (service set identification) and Password through a system generated equivalent QR code that can then be scanned to automatically connect to the Wi-Fi network. The system receives a request for Wi-Fi settings at a premises, identifies customer equipment associated with the premises, identifies an Wi-Fi SSID (Service Set Identification) and password associated with the customer equipment, generates a QR (Quick Response) code representing the Wi-Fi SSID and password, sends the QR code to one or more devices associated with the premises for display and subsequent scanning at the premises.

13 Claims, 9 Drawing Sheets

(56) References Cited

U.S. PATENT DOCUMENTS

| | | | | |
|---|---|---|---|---|
| 2015/0124791 A1* | 5/2015 | Mazandarany | ........ | H04W 76/11 370/338 |
| 2015/0327060 A1* | 11/2015 | Gilson | ................. | H04W 76/11 726/7 |
| 2017/0300732 A1* | 10/2017 | Likar | .................. | H04W 12/068 |
| 2020/0145826 A1* | 5/2020 | Katz | .................... | G06K 7/1417 |
| 2020/0228337 A1* | 7/2020 | Sumien | ............... | H04W 12/069 |
| 2020/0274713 A1* | 8/2020 | Li | ......................... | H04L 9/3221 |

\* cited by examiner

FORMULATION AND DISPLAY OF WIRELESS CONNECTION CREDENTIALS

BACKGROUND OF THE DISCLOSURE

Customers at a home or business attempting to connect a wireless device, such as a mobile phone or tablet, to an available wireless network may have forgotten or do not know network login information, such as an Wi-Fi SSID (wireless fidelity service set identification) and associated password (hereafter known as Wi-Fi, wireless network credentials or network credentials). Without this login information, the user is required to seek this information from other sources, such as contact technical support or from someone else associated with the wireless network who remembers this information.

Consequentially, a need exists for a solution to retrieve network login information at a premises "on demand" and thereafter provide a connection to the Wi-Fi. In addition, a need exists to provide authorized access to a wireless network without actually revealing potentially confidential ID and password information, thus increasing security of the network.

BRIEF DESCRIPTION OF THE DRAWINGS/FIGURES

The accompanying drawings, which are included to provide a further understanding of the disclosure and are incorporated in and constitute a part of this specification, illustrate exemplary embodiments. In the drawings.

The present disclosure will now be described with reference to the accompanying drawings. In the drawings, like reference numbers may indicate identical or functionally similar elements.

DETAILED DESCRIPTION OF THE DISCLOSURE

Figure 1:
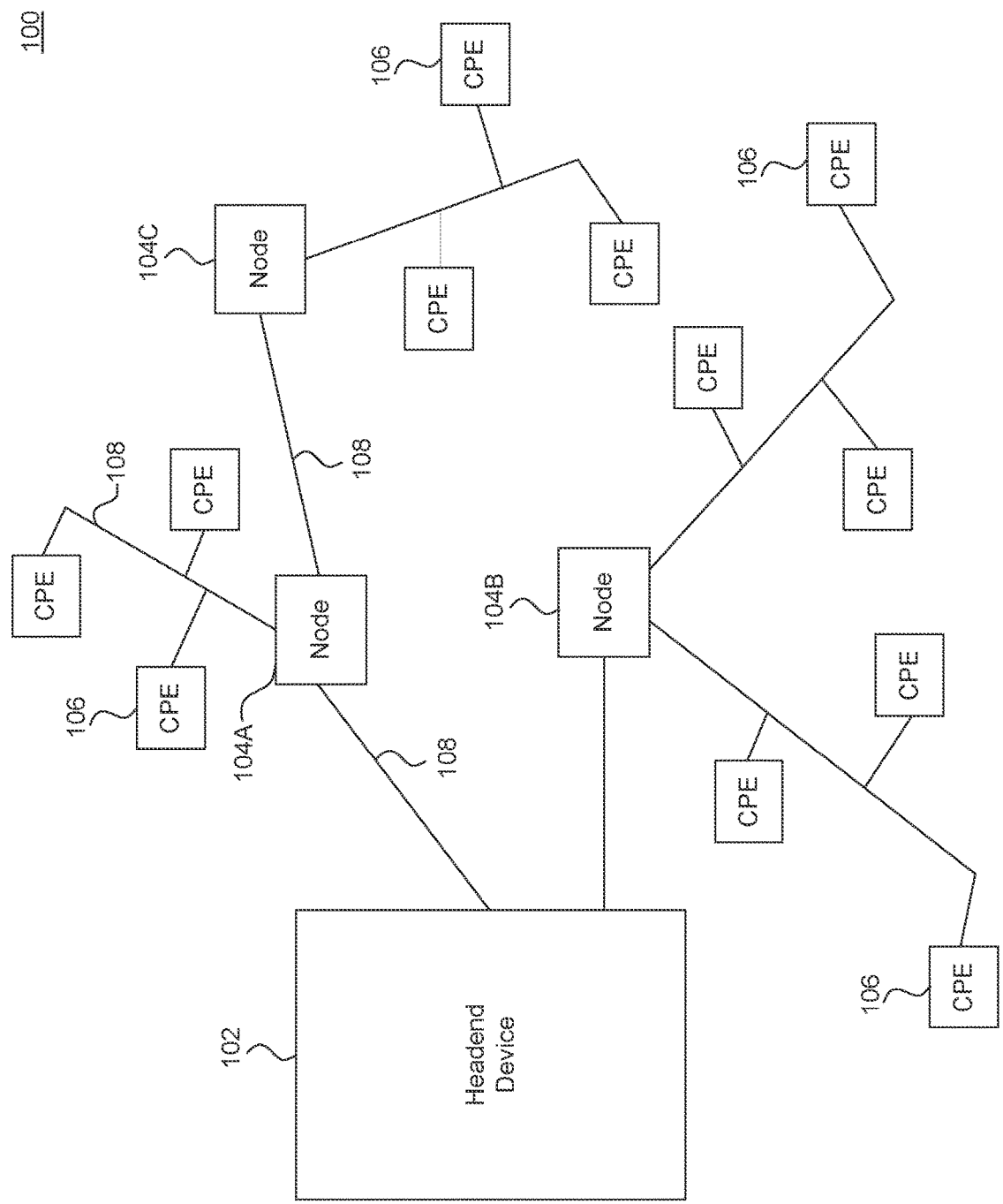
FIG. 1 is a block diagram of a portion of an example network environment, according to some embodiments.

Embodiments of the current disclosure help users interact with Customer Premises Equipment (CPE) to dynamically receive a Quick Response Code (QR Code). Users are provided a platform for a one-time, on-demand request for Wi-Fi username and password (default or user customized). A received QR code represents an equivalent graphical representation of the requested network login information (network credentials) allowing for easy connectivity to an associated Wi-Fi network by subsequent scanning of the received QR code.

Currently, a customer setting up a home or business Wi-Fi network has an option to retain a default username and password that comes on the "box" (modem+router combo or a gateway) or to customize SSID and password information. Customers can turn on "guest" Wi-Fi, but still have a burden to remember the SSID and password. In addition, customers often recycle commonly used passwords. While described for a home or business, embodiments included herein are applicable to any location where there is available Wi-Fi connection, including but not limited to, transit stations, schools, stadiums, arenas, Multiple Dwelling Units (MDUs). Also, while smartphone and tablets are described as example devices, the various embodiments are applicable to any 'smart' device, including but not limited to, smart speakers, smart TVs, Electronic Vehicles (EVs), gym equipment, wearable technology (watches, health fitness bands, etc.). The various embodiments disclosed herein prevent disclosure of this password.

In one example embodiment, a user can interact with a television set to request, receive and display a QR code representing the network credentials. This interaction can be via a television remote control, a voice assistant system (e.g., interactive voice TV remote control or network connected home assistant) or through keyboard entry (on or off-screen). Delivery of a dynamically generated QR is provided to the television on a dedicated TV channel or as an overlay on the currently tuned channel. A user looking to connect to the Wi-Fi simply scans the television displayed QR code displayed on the selected channel without ever knowing the actual network credentials.

In another example embodiment, a user can interact with a mobile telephone connected to the wireless network of interest to request, receive and display a QR code representing the network credentials. Delivery of a dynamically generated QR code can be via a chat platform via text message and other media platforms including, but not limited to, messaging platforms, communication apps or websites. In one example, the home owner requests the information by text messaging, receives a QR code representing the network credentials and allows a visitor to their home to scan the QR code displayed on their phone without actually knowing the SSID and password (same mechanism for home SSID/PWD and Guest SSID/PWD).

In yet another example embodiment, a user can interact with a printed QR code representing the network credentials. Delivery of the QR code for printing can be by any of the embodiments for requesting network credentials as described herein. For example, the delivery can be via a dedicated TV channel, by chat platform via text message, apps and other platforms including, but not limited to, messaging platforms or websites. A printer connected to the network or associated with a user device making the request for network credentials, can subsequently print the QR code and display this "on-premises" for future scanning. For businesses, electronic displays (like a photo frame) that is connected to the router, can retrieve the QR code and display it on-premises. In one example, a visitor to your home/business need only scan the printed QR code, without ever knowing the actual network credentials.

FIG. 1 illustrates a block diagram of a portion of an example network environment 100 according to the embodiments disclosed herein. As to be discussed in further detail below, a system 100 receives a request for network credentials (e.g., SSID and password) through user interaction with one or more CPEs 106. In some situations, the system 100 receives a specific text-based or voice inquiry based on the user interaction.

In some embodiments, network environment 100 may be managed by a cable provider. Network environment 100 can include headend device 102, nodes 104A-C (e.g., fiber nodes), CPE (customer premises equipment) devices 106 and cables 108 (e.g., coaxial or fiber cables) interconnecting the various nodes and customer premises equipment (CPEs). Headend device 102 can transmit CPE data collection instructions to, and receive CPE data packages from, any of CPE devices (e.g., 106) via cables 108. Although illustrated as cable/fiber connections, one or more connected cabling instances may be replaced by wireless, cellular, Bluetooth™, near-field, microwave, satellite, or other known or future communications systems and methods without departing from the scope of the technology described herein.

Headend device 102 provides programming content and CPE data collection instructions, receives CPE data packages, generates CPE datasets, and determines CPE diagnostic data. In some aspects, nodes 104A-C may receive CPE data collection instructions directly from headend device 102. Alternatively, one or more of nodes 104A-C may receive CPE data collection instructions indirectly from headend device 102, such as from another node (e.g., node 104A). In some aspects, nodes 104A-C may receive CPE data packages directly from CPE devices 106. Alternatively, one or more of nodes 104A-C may receive CPE data packages indirectly from CPE devices 106, such as from another node (e.g., node 104B).

Figure 2:
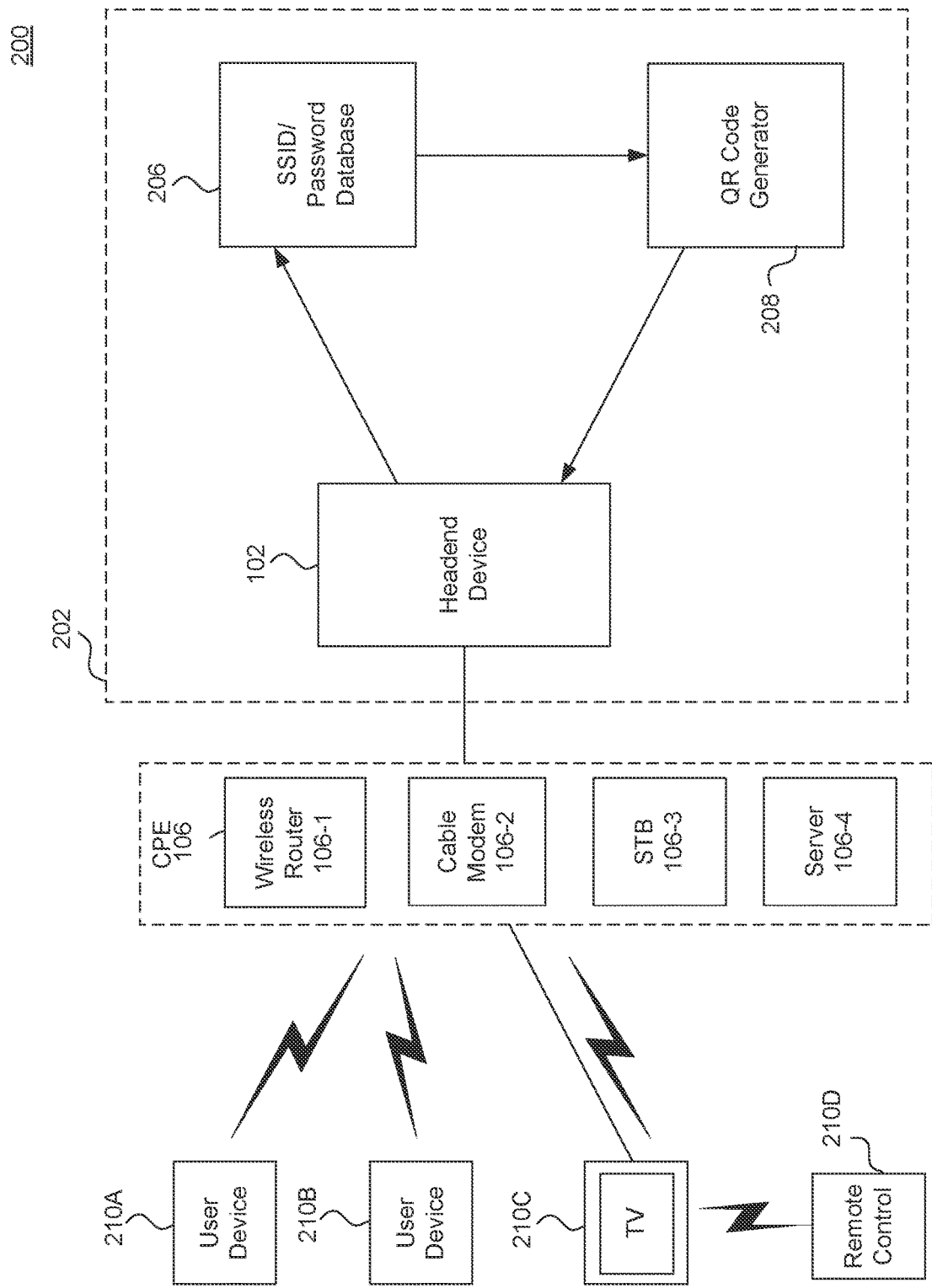
FIG. 2 illustrates another block diagram of a portion of an example network environment generating a QR code from Wi-Fi network credentials used in the embodiments disclosed herein.

FIG. 2 illustrates a block diagram of a portion of an example network environment generating a QR code from Wi-Fi network credentials used in the embodiments disclosed herein. In one example embodiment, a user can interact with the CPE to request, receive and display a QR code representing the network credentials. Delivery of a dynamically generated QR is provided to the user by television through a dedicated TV channel, or alternatively via text message, or other platforms including, but not limited to, messaging platforms and other websites.

System 200 includes cable network headend device 102, cable backend processing elements including at least a SSID/Password database 206 and QR code generator 208. In IEEE 802.11 wireless local area networking standards, a service set is a group of wireless network devices which are identified by the same SSID. SSIDs serve as "network names" and are typically natural language labels. Requests for network credentials are received at the headend 102 from customer premises equipment 106. A CPE processing the request is identified by any of: an SSID, a network address, a network name, a gateway name, a specific geolocation, customer identifiers, or other identifying methods. Once the CPE has been identified, a corresponding paired SSID and password can be retrieved from, for example, a LUT (look-up table) in database 206. In an alternative embodiment, the network credentials are stored locally at the CPE or located in cloud-based servers remotely from the cable network infrastructure and provided to the QR generator over communication networks.

The paired SSID/password is converted to an equivalent QR code in QR code generator 208. In an alternative embodiment, the QR code or QR code generator 208 is stored/located locally at the CPE or located in cloud-based servers remotely from the cable network infrastructure and communicatively connected to the CPE.

A QR code (Quick Response code) is a type of matrix barcode (or two-dimensional barcode). A barcode is a machine-readable graphical label that contains information about the item to which it is attached. In practice, QR codes often contain data for a locator, identifier, or tracker that points to a website or application.

Customer premises equipment or customer-provided equipment (CPE) 106 is any terminal and associated equipment located at a subscriber's premises and connected with a carrier's telecommunication circuit at the demarcation point. The demarcation point is established in a building or complex to separate customer equipment from the equipment located in the distribution infrastructure (e.g., node or headend) of the communications service provider. CPE can refer to devices purchased by the subscriber, or to those provided by the operator or service provider (e.g., cable service provider).

CPE generally refers to devices such as wireless routers, cable modems, network switches, residential gateways (RG), set-top box (STB), fixed mobile convergence products, mobile telephones, wireless access points (WAPs), home networking adapters, or Internet access gateways that enable consumers to access providers' communication services and distribute them in a residence or enterprise with a local area network (LAN). The CPE can communicate within the subscriber premises using wired connections (e.g., through STB) or by wireless communications (e.g., through wireless router) as described in greater detail hereafter.

As shown, CPE 106 includes one or more of a wireless router 106-1 for communicating with devices connected to a customer premises wireless network, a cable modem 106-2 for communicating with headend 102, set top box (STB) 106-3 for communicating with television (TV) device 210C over a cable connection and a server 106-4 for processing data to/from the CPE.

User devices 210A-B include any device that is able to communicate with the CPE through the previously described wireless or wired communication channels. User devices include, but are not limited to, mobile telephones, tablets, internet connected voice active assistants, laptops, personal computers, computer workstations, wearable computers, etc. In one example embodiment, a user can interact with a user device connected to the wireless network of interest to request, receive and display a QR code representing the network credentials. The CPE receives the request, identifies the CPE and passes the request to the headend. The QR code generates an equivalent graphic representation (QR code) of a paired S SID and password and returns the QR code through the headend 102 to the customer premises equipment and delivers it to one or more user devices 210A-D for subsequent display.

In one example embodiment, a user can interact with television device 210C to request, receive and display a QR code representing the network credentials. TV 210C can be a conventional television connected to a cable TV STB, STB-less television, television with integrated STB functionality, smart television, wirelessly connected television, mobile device streaming TV signals, or a second screen device displaying the TV screen in parallel or as a separate display. User interaction with the television can be by conventional remote control, voice interactive remote, network connected voice assistants, a keyboard, etc.

Television device 210C performs one or more operations in accordance with the electrical command received from the CPE 106. For example, the one or more operations can include typical operations corresponding to the direct audio command, such as "volume up," "volume down," "channel up," "channel down," "closed-captioning on," and/or "closed-captioning off" to provide some examples as described above, which directly control operation of the television device 210C. The one or more operations can alternatively, or additionally, include operations corresponding to the indirect audio command, such as "watch <movie name>," "watch <programming channel name>," "play <application name>," and/or "search <search term>" to provide some examples as described above. In addition, although the remote control device 210D and the television device 210C are illustrated as being separate electronic devices in FIG. 2, this is for illustrative purposes only. Those skilled in the relevant art(s) will recognize that they can be integrated within a single electronic device, a voice controlled television, a tablet computer or mobile phone to provide some examples, without departing from the spirit and scope of the present disclosure.

Users provide their input, for example, by talking into the remote (or directly to the TV) and the remote control device transfers their audio input to a CPE. User's audio input can be for example, "Wi-Fi login info needed", "Wi-Fi Password?", or "connect to Wi-Fi". The CPE processes the audio input and determines the required action or search results, and then provides information about the required action or the search results. To process the audio input, the CPE may utilize a server 106-4 for further processing. Server 106-4 can be a standalone device or be integrated within any of the other CPE device elements such as 106-3 (STB). The CPE enables performing the requested action or presenting the search results on the display device. The audio input is first analyzed to determine its audio intent. Audio intent comprises one or more textual words associated with the content of the corresponding audio input.

Server 106-4 includes, for example, an audio processor, an intent processor, and a search processor (not shown). However, in some situations, the functionality of the audio processor, the intent processor, and the search processor, as to be described in further detail below, can be performed using any suitable number of processors, such as one processor or two processors to provide an example, that will be apparent to those skilled in the relevant art(s) without departing from the spirit and scope of the present disclosure. Moreover, although the audio processor, the intent processor, and the search processor are described as being included within server 106-4, those skilled in the relevant art(s) will recognize one or more of these elements can be located remote from the server and/or accessed by the server without departing from the spirit and scope of the present disclosure.

The audio processor analyzes and/or processes the digital audio command to determine one or more textual words present within the digital audio command (e.g., using speech recognition) to include Hidden Markov Models, neural networks, or other techniques apparent to persons skilled in the relevant art to recognize and translate the digital audio command into text. The audio processor analyzes, processes, and/or translates the digital audio command to determine the one or more textual words, such as one or more keywords, present within the corresponding audio command. The intent processor interprets the one or more textual words as determined by the audio processor to provide the electrical command and the search processor selects one or more command words and/or phrases from among a listing of command words and/or phrases corresponding to various electrical commands.

If the one or more selected command words and/or phrases are not present within the one or more textual words, the search processor selects one or more other command words and/or phrases from among the listing of command words and/or phrases corresponding to another similar electrical command. Otherwise, the search processor maps the one or more textual words to the electrical command corresponding to the one or more selected command words and/or phrases from the listing of command words and/or phrases when the one or more selected command words and/or phrases are present within the one or more textual words.

From the example above, the one or more textual words can include "Wi-Fi login info needed", "Wi-Fi Password?", or "connect to Wi-Fi" or equivalents. In this example, the search processor selects maps the "<Wi-Fi login info needed>" to the electrical command corresponding to "<request network credentials>" from the listing of command words and/or phrases.

In another example embodiment, the home owner requests a code via a television channel using a remote control (not audio) or a button on the set top box remote.

In another example embodiment, the home owner requests the information by text messaging from a device connected to the wireless network of the premises. In response, the system sends a QR code representing the network credentials to the requesting device and allows a visitor to their premises (home) to scan the QR code displayed on their device (e.g., phone) without actually knowing the SSID and password.

In yet another example embodiment, a user can interact with a printed QR code representing the network credentials. Delivery of the QR code for printing can be by any of the embodiments for requesting network credentials as described herein. For example, the delivery can be via a dedicated TV channel, by chat platform via text message, apps and other platforms including, but not limited to, messaging platforms and other websites. A printer connected to the network or associated with a user device making the request for network credentials, can subsequently print the QR code and display this on-premises for future scanning. In one example, a visitor to your home needs only to scan the QR code, without ever knowing the actual network credentials.

Figure 3:
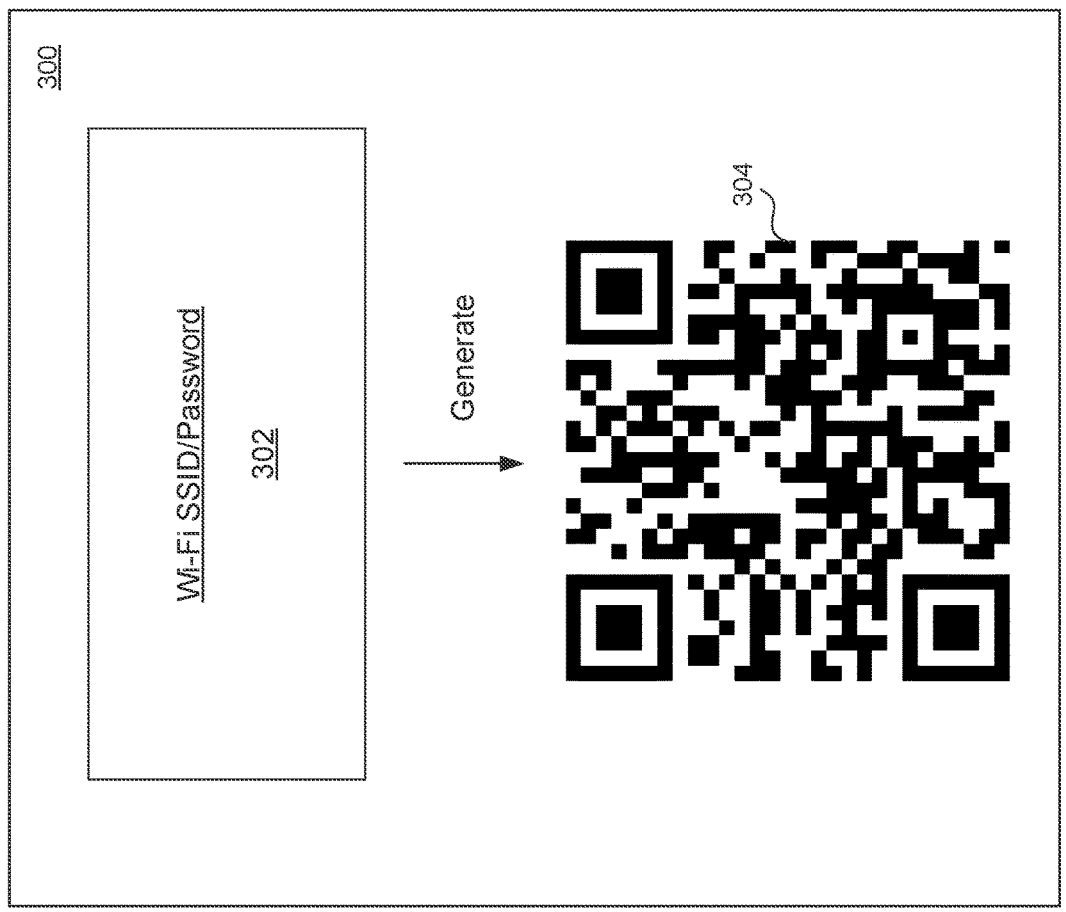
FIG. 3 illustrates a block diagram of generating a QR code which can be used to implement the embodiments disclosed herein.

FIG. 3 illustrates a block diagram of generating a QR code 304 which can be used to implement the embodiments disclosed herein. Graphically, a QR code 304 consists of black squares arranged in a square grid on a white background, which can be read by an imaging device such as a camera (e.g., on a smartphone), and processed using Reed-Solomon error correction until the image can be appropriately interpreted. The required data is then extracted from patterns that are present in both horizontal and vertical components of the image. The QR code is characterized by fast readability and greater storage capacity compared to standard UPC barcodes. Typical applications include product tracking and item identification.

The QR code data, in this case, reflects the network credentials to enable a user to login to a requestor's wireless network. For example, in one embodiment, the data is the SSID and corresponding password of the wireless network where the request originated. In an alternative embodiment, the SSID is known and the QR code data is only the password. In another alternative embodiment, the network credentials data is encrypted or protected by other security measures before generating the QR using QR generator 208. The QR code, once generated, is passed back to the requesting wireless network (e.g., through the cable network 100) for display on one or more user devices.

Figure 4:
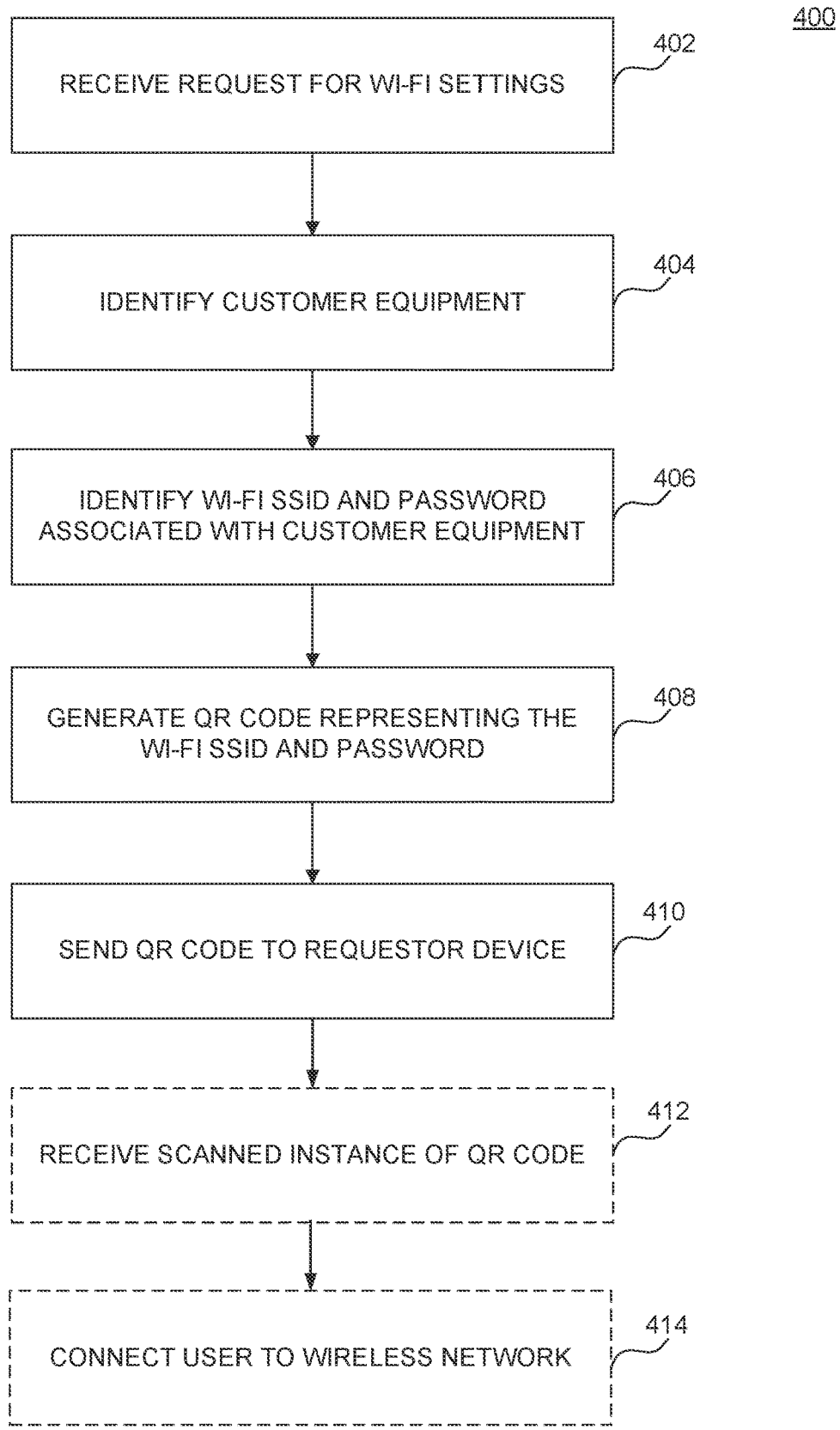
FIG. 4 illustrates an operational control flow to process a request for network credentials, according to an example embodiment.

FIG. 4 illustrates an operational control flow 400 to process one or more requests for network credentials, according to an example embodiment. The system includes one or more computer processors, a computer memory coupled to the one or more computer processors and configured to return a QR code to a requester based on a request received at customer premises equipment (CPE).

In step 402, the system receives a user request for Wi-Fi settings at a premises. The user request is initiated by user device interaction with CPE at the premises location. For example, the user uses a voice command to request network credentials to be displayed on a selected channel on a television device located at the premises.

In step 404, the system identifies customer equipment associated with premises equipment associated with the request. The request is identified by any of: an SSID, a network address, a network name, a gateway name, a specific geolocation, customer identifiers, or other identifying methods.

In step 406, the system identifies network credentials, such as Wi-Fi SSID and corresponding password associated with the identified customer equipment. In one embodiment, the network credentials are located in cable network backend infrastructure (as shown in FIG. 2 SSID/Password database 206 for look-up). However, in an alternative embodiment, the network credentials are stored locally at the CPE or located in cloud-based servers remotely from the cable network infrastructure.

In step 408, the system generates a QR (Quick Response) code representing the Wi-Fi SSID and password. The QR code data, in this case, reflects the network credentials to enable a user to login to a requestor's wireless network. For example, in one embodiment, the data is the SSID and corresponding password of the wireless network where the request originated. In an alternative embodiment, the SSID is known and the QR code is the password only. In another alternative embodiment, the network credentials data is encrypted or protected by other security measures before generating the QR using QR generator 208. The QR code, once generated, is passed back to the requesting wireless network (e.g., through the cable network 100) for display on one or more user devices. In an alternative embodiment, the QR code is pre-stored/stored locally on the CPE (before or after a subsequent request for network credentials). For example, the default network credentials are pre-stored on the device as a QR code during manufacture or automatically sent to the device to be stored locally each time the SSID or password are changed.

In step 410, the system sends the QR code to one or more devices associated with the premises. In one embodiment, the QR code is displayed on the requesting device, such as a television, telephone, tablet, mobile telephone, display of connected voice active assistant, laptop, personal computer, computer workstation, wearable computer, etc.

In step 412 (optional), the system receives a scanned instance of the QR code from the one or more devices associated with the premises. For example, a homeowner requests the network credentials, receives the QR code and displays it on a user device associated with the wireless network.

In step 414 (optional), the system connects the user based on the scanned QR code. For example, a homeowner requests the network credentials, receives the QR code and has their guest scan the displayed code to connect to their Wi-Fi network.

Figure 5:
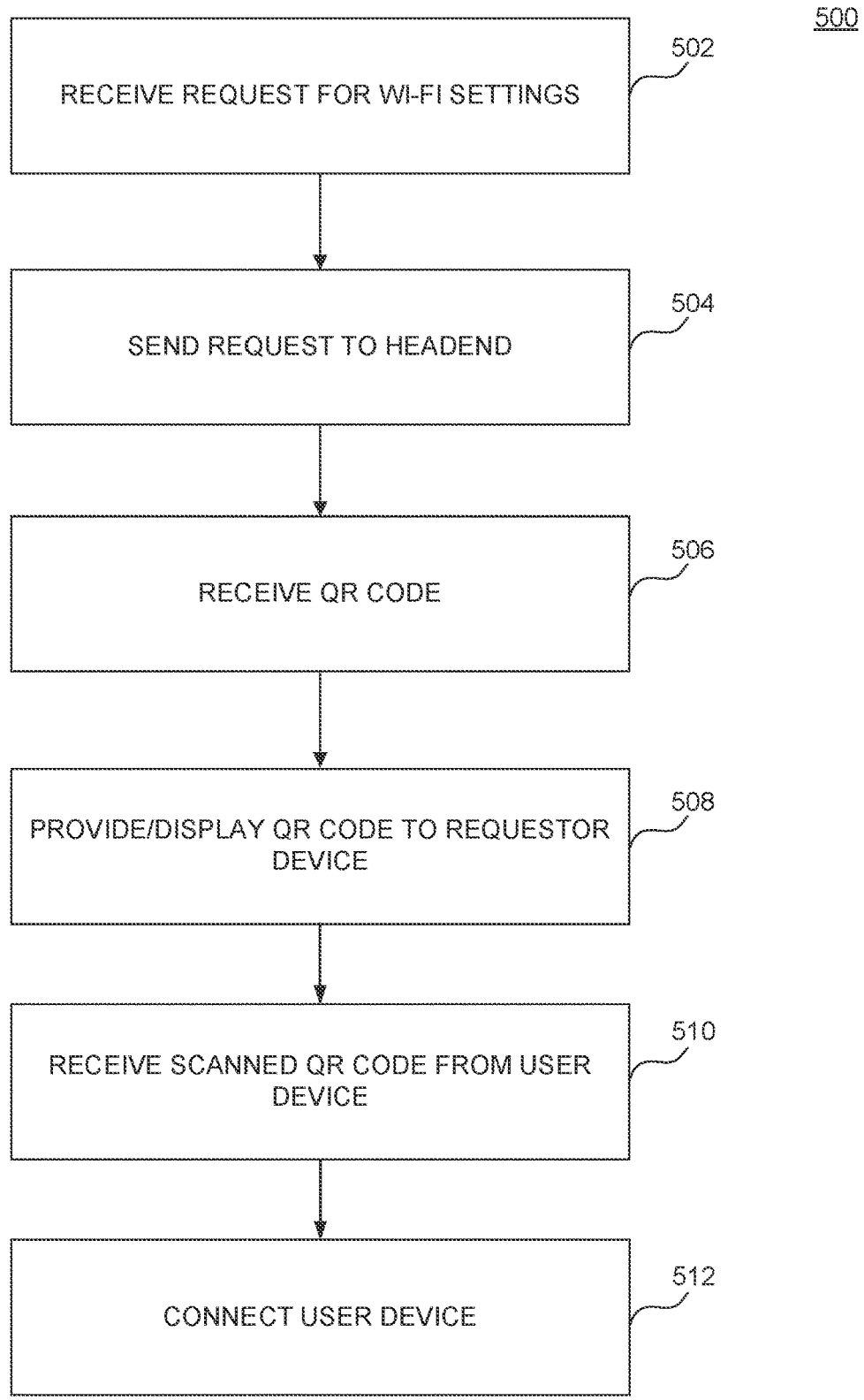
FIG. 5 illustrates another operational control flow to process a request for network credentials, according to an example embodiment.

FIG. 5 illustrates an operational control flow 500 to process one or more requests for network credentials, according to an example embodiment.

In step 502, the system receives a user request for Wi-Fi settings at a premises. For example, the user request is initiated by user device interaction with CPE at the premises location. In one embodiment, the user uses a voice command to request network credentials to be displayed on a selected channel on a television device located at the premises.

In step 504, the system sends (processes and communicates) the request to the headend. For example, a request received through the television 210C, is received by a connected STB 106-3, processed by server 106-4 and communicated to headend 102 through cable modem 106-2.

In step 506, the system receives a QR (Quick Response) code representing the Wi-Fi SSID and password. For example, the CPE receives the QR code. The QR code, in this case, reflects network credentials to enable a user to login to a requestor's wireless network. For example, in one embodiment, the QR code is an SSID and corresponding password of the wireless network where the request originated. In an alternative embodiment, the SSID is known and the QR code represents the password only. In another alternative embodiment, the network credentials data is encrypted or protected by other security measures before QR generation.

In step 508, the system provides the QR code to one or more devices associated with the premises. For example, a homeowner requests the network credentials, receives the QR code and it is subsequently displayed on a user device associated with the wireless network. In one embodiment, the QR code is displayed on the requesting device, such as a television, telephone, tablet, mobile telephone, tablet, display of connected voice active assistants, laptops, personal computers, computer workstations, wearable computers, etc.

In step 510, the system receives a scanned instance of the QR code from the one or more devices associated with the premises. For example, a homeowner requests the network credentials, receives the QR code and displays it on a user device associated with the wireless network.

In step 512, the system connects the user based on the scanned QR code. For example, a homeowner requests the network credentials, receives the QR code and has their guest scan the displayed code to connect to their Wi-Fi network.

Figure 6:
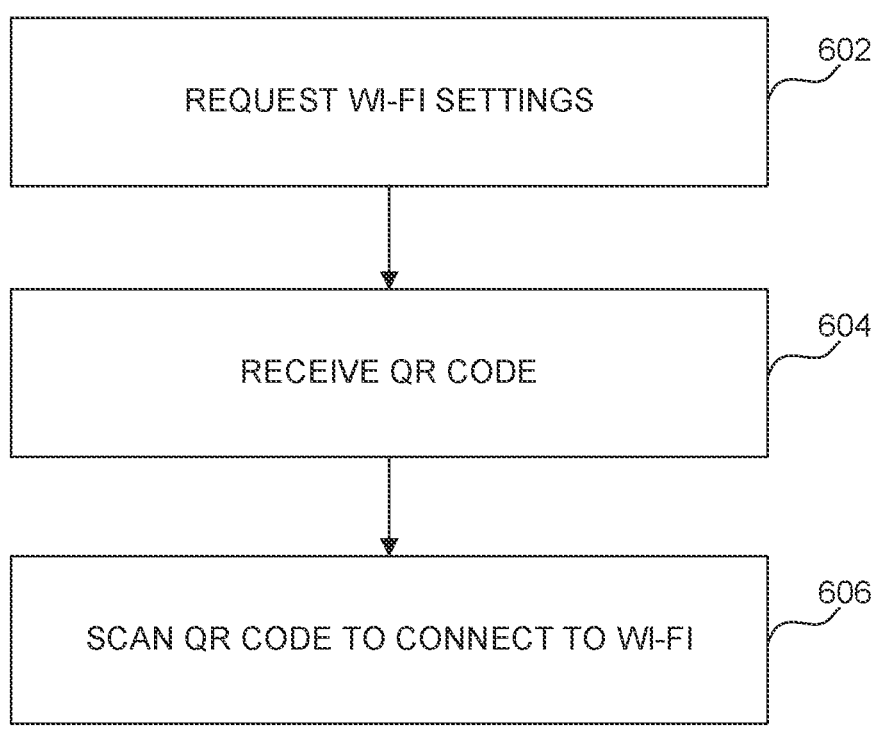
FIG. 6 illustrates another operational control flow to process a request for network credentials, according to an example embodiment.

FIG. 6 illustrates another operational control flow 600 to process one or more requests for network credentials, according to an example embodiment.

In step 602, the user interacts with a user device connected to a premises network and requests Wi-Fi settings at the premises. For example, the user request is initiated by user device interaction with CPE at the premises location. In one embodiment, the user uses a voice command to request network credentials to be displayed on a selected channel on a television device located at the premises.

In step 604, the user device receives a QR (Quick Response) code representing the Wi-Fi SSID and password. The QR code, in this case, reflects network credentials to enable a user to login to a requestor's wireless network. For example, in one embodiment, the QR code is an SSID and corresponding password of the wireless network where the request originated. In an alternative embodiment, the SSID is known and the QR code represents the password only. In another alternative embodiment, the network credentials data is encrypted or protected by other security measures before QR generation.

In step 606, a user (e.g., original requester, visitor, or customer) scans the displayed QR code and is connected to the associated Wi-Fi network.

Figure 7:
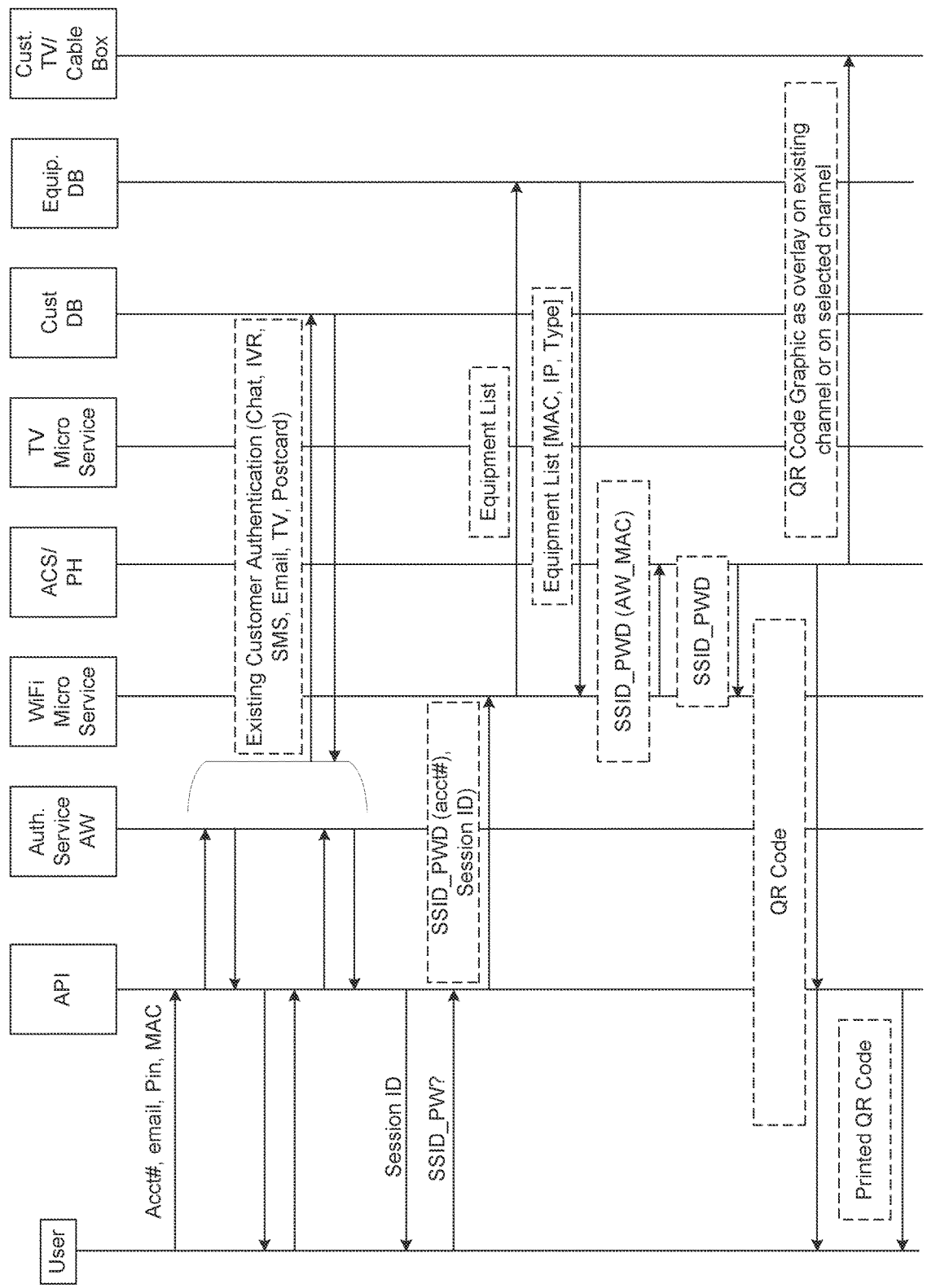
FIG. 7 illustrates a timing diagram to process a request for network credentials, according to an example embodiment.

FIG. 7 illustrates an example timing diagram to process a request for network credentials. As shown, the system receives a user-initiated interaction with an API (application programming interface) to connect with a local Wi-Fi system. The user request is initiated by user device interaction with CPE at the premise's location. For example, the user interacts with a display of a smartphone or a voice command to request network credentials SSID_PW (service set identifier and password) to be displayed on a selected channel on a television device located at the premises.

The user-initiated interaction with an API (application programming interface) shall be authenticated via one of the methods (e.g., account number, email, PIN (personal identification number), MAC, access code, security questions, using an Auth Service application).

Existing customer authentication can be implemented using any of chat, IVR (interactive voice response), SMS (short message service), email, TV (television), postcard, etc.). Upon authentication, a session ID is created for the request.

A subsequent request for the SSID_PW (password for CPE) is received through the API to the Wi-Fi micro service.

The system (equipment database (DB) identifies customer equipment associated with premises equipment associated with the request. The request is identified by any of: an SSID, a network address, a network name, a gateway name, a specific geolocation, customer identifiers, or other identifying methods.

The system identifies network credentials, such as Wi-Fi SSID and corresponding password associated with the identified customer equipment. In one embodiment, the network credentials are located in cable network backend infrastructure (as shown in FIG. 2 SSID/Password database 206 for look-up). However, in an alternative embodiment, the network credentials are stored locally at the CPE (e.g., in a local physical (PH) storage) or located in ACS (Auto Configuration Server) remotely from the cable network infrastructure.

The system (e.g., ACS or PH) generates/retrieves a QR (Quick Response) code representing the Wi-Fi SSID and password. The QR code data, in this case, reflects the network credentials to enable a user to login to a requestor's wireless network. For example, in one embodiment, the data includes the SSID and corresponding password of the wireless network where the request originated. In an alternative embodiment, the SSID is known and the QR code is the password only. In another alternative embodiment, the network credentials data is encrypted or protected by other security measures before generating the QR using QR generator 208. The QR code, once generated, is passed back to the requesting wireless network (e.g., through the cable network 100) for display on one or more user devices. In an alternative embodiment, the QR code is pre-stored/stored locally on the CPE (before or after a subsequent request for network credentials). For example, the default network credentials are pre-stored on the device as a QR code during manufacture or automatically sent to the device to be stored locally each time the S SID or password are changed.

The system sends the QR code to one or more devices associated with the premises. In one embodiment, the QR code is displayed on the requesting device, such as a television (overlay), telephone, tablet, mobile telephone, display of connected voice active assistant, laptop, personal computer, computer workstation (can also be printed), wearable computer, printer, etc.

Figure 8:
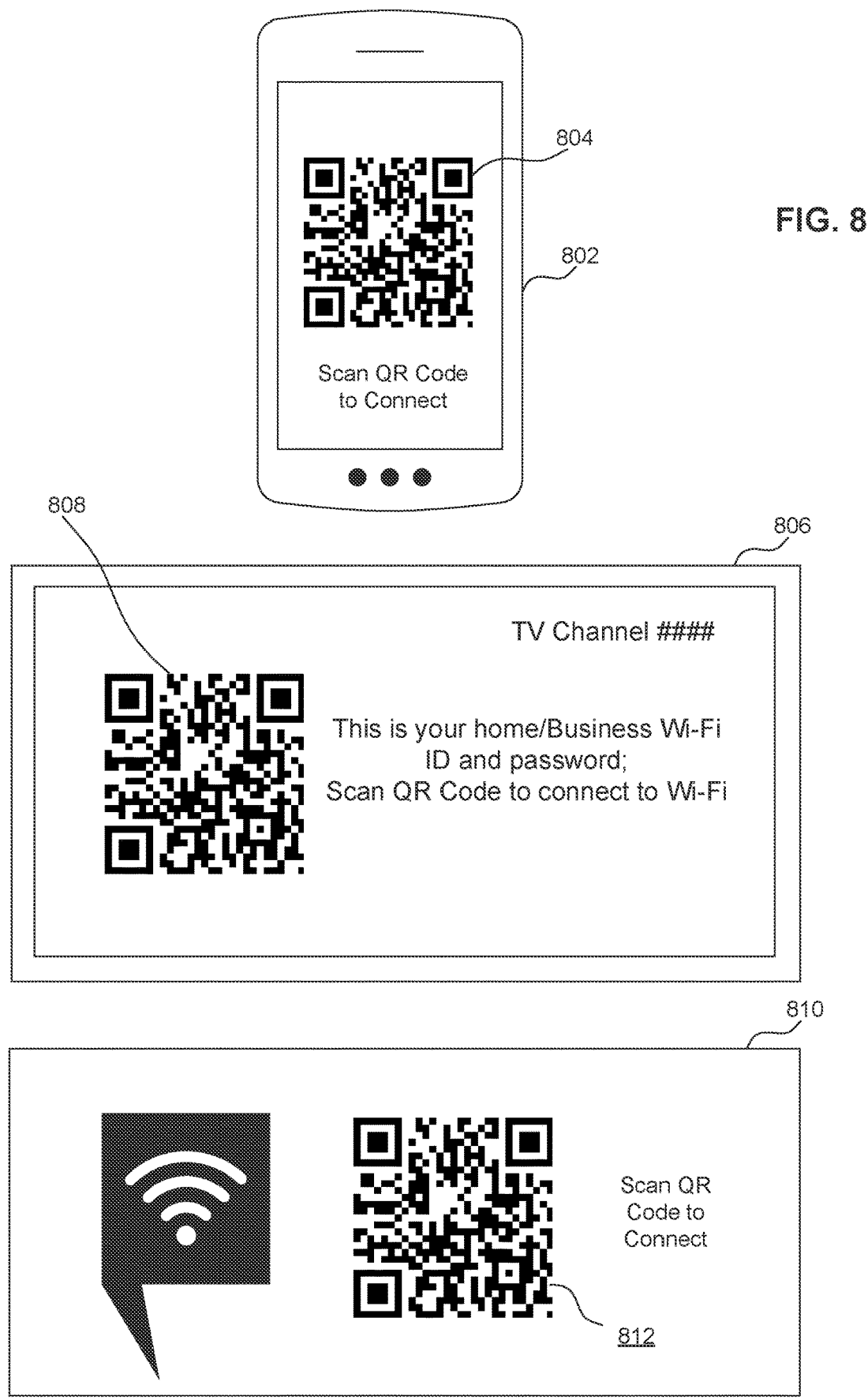
FIG. 8 illustrates examples of displayed QR codes used in the embodiments disclosed herein.

FIG. 8 illustrates examples of displayed QR codes of Wi-Fi network credentials used in the embodiments disclosed herein.

Mobile telephone 802 displays a received QR code 804 with instructions to scan the code to connect to the network (premises Wi-Fi). For example, a homeowner texts a request for their ID and password to their Wi-Fi network. The system returns the QR code as a graphic displayed on their phone. They can then allow a guest to scan the QR code and connect to the network without revealing (or knowing) their private network credential information.

Television device 806 displays a received QR code 808 with instructions to scan the code to connect to the network. For example, a homeowner uses their voice controlled TV remote control to request for their ID and password to their Wi-Fi network. The system returns the QR code as a graphic displayed on a selected channel of their television device. They can then allow a guest to scan the QR code and connect to the network (premises Wi-Fi) without revealing (or knowing) their private network credential information.

A printed 810 QR code 812 represents the network credentials. Delivery of the QR code for printing can be by any of the embodiments for requesting network credentials as previously described herein. For example, the delivery can be via a dedicated TV channel, by chat platform via text message, apps and other platforms including, but not limited to, messaging platforms and other websites. A printer connected to the network or associated with a user device making the request for network credentials, can subsequently print the QR code and display this on-premises for future scanning. In one example, a visitor to your home/business needs only to scan the QR code, without ever knowing the actual network credentials. The printed QR code enables customers at, for example, a restaurant to simply scan the code to connect to the premises Wi-Fi, without having to ask restaurant staff.

The representative functions described herein can be implemented in hardware, software, or some combination thereof. For instance, the representative functions can be implemented using computer processors, computer logic, application specific circuits (ASIC), digital signal processors, etc., as will be understood by those skilled in the arts based on the discussion given herein. Accordingly, any processor that performs the functions described herein is within the scope and spirit of the embodiments presented herein.

Figure 9:
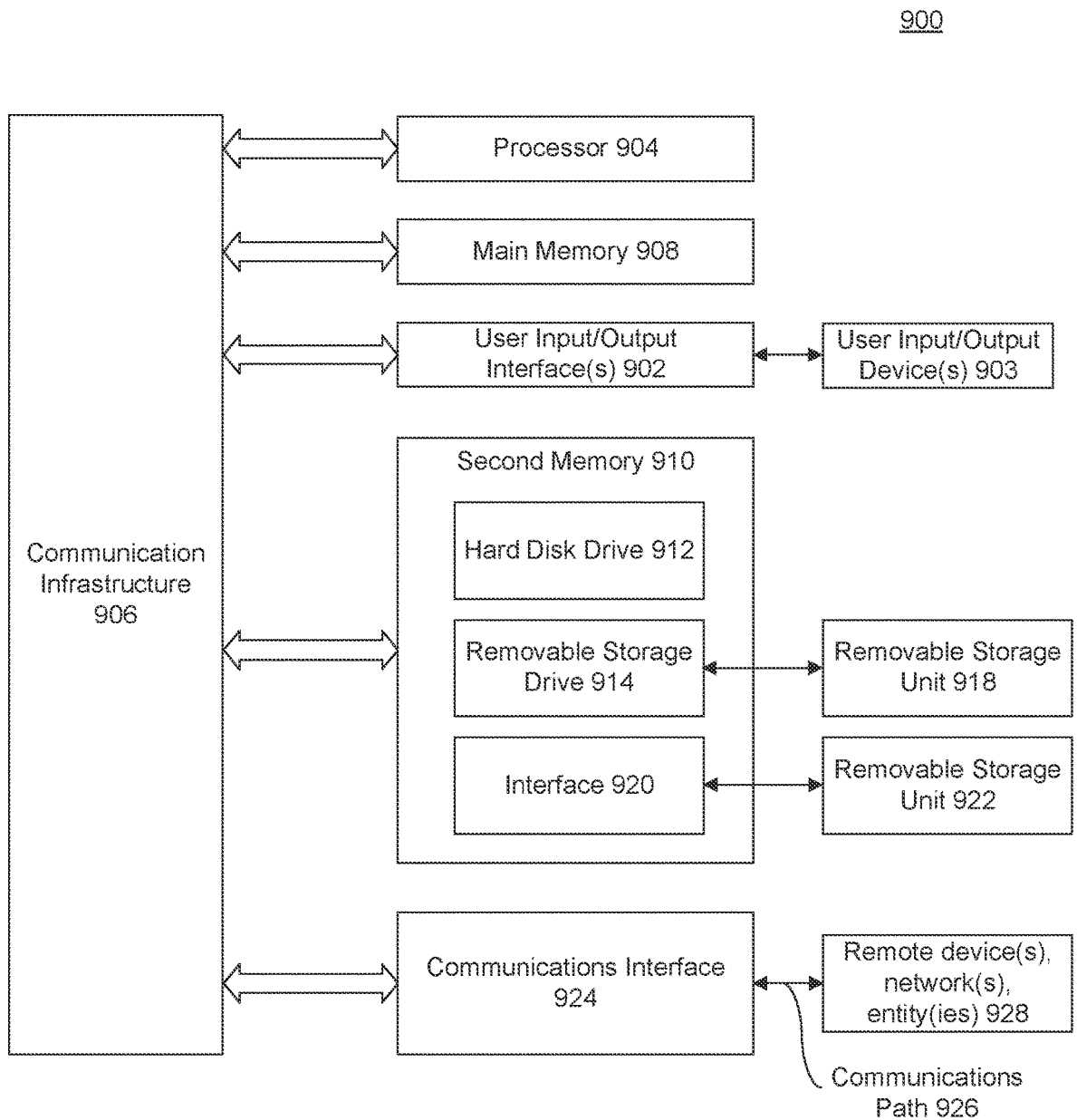
FIG. 9 is a block diagram of an exemplary computer system which can be used to implement the embodiments disclosed herein.

The following describes a general-purpose computer system that can be used to implement embodiments of the disclosure presented herein. The present disclosure can be implemented in hardware, or as a combination of software and hardware. Consequently, the disclosure may be implemented in the environment of a computer system or other processing system. An example of such a computer system 900 is shown in FIG. 9.

Computer system 900 includes one or more processors (also called central processing units, or CPUs), such as processor 904. Processor 904 can be a special purpose or a general purpose digital signal processor. Processor 904 is connected to a communication infrastructure 906 (for example, a bus or network). Various software implementations are described in terms of this exemplary computer system. After reading this description, it will become apparent to a person skilled in the relevant art how to implement the disclosure using other computer systems and/or computer architectures.

Computer system 900 also includes user input/output device(s) 903, such as monitors, keyboards, pointing devices, etc., that communicate with communication infrastructure 906 through user input/output interface(s) 902.

Computer system 900 also includes a main memory 905, preferably random access memory (RAM), and may also include a secondary memory 910. The secondary memory 910 may include, for example, a hard disk drive 912, and/or a RAID array 916, and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918 represents a floppy disk, magnetic tape, optical disk, etc. As will be appreciated, the removable storage unit 918 includes a computer usable storage medium having stored therein computer software and/or data.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software (i.e. instructions) and data to be transferred from the removable storage unit 922 to computer system 900.

Computer system 900 may also include a communications interface 924. Communication interface 924 enables computer system 900 to communicate and interact with any combination of remote devices, remote networks, remote entities, etc. (individually and collectively referenced by reference number 928). Examples of communications interface 924 may include a modem, a network interface (such as an Ethernet card), a communications port, a PCMCIA slot and card, etc., that are coupled to a communications path 926. The communications path 926 can be implemented using wire or cable, fiber optics, a phone line, a cellular phone link, an RF link and other communications links or channels.

The terms "computer program medium" and "computer usable medium" are used herein to generally refer to media such as removable storage drive 914, a hard disk installed in hard disk drive 912, or other hardware type memory. These computer program products are means for providing or storing software (e.g. instructions) to computer system 900.

Computer programs (also called computer control logic) are stored in main memory 905 and/or secondary memory 910. Computer programs may also be received via communications interface 924. Such computer programs, when executed, enable the computer system 900 to implement the present disclosure as discussed herein. In particular, the computer programs, when executed, enable the processor 904 to implement the processes and/or functions of the present disclosure. For example, when executed, the computer programs enable processor 904 to implement part of or all of the steps described above with reference to the flowcharts herein. Where the disclosure is implemented using software, the software may be stored in a computer program product and loaded into computer system 900 using raid array 916, removable storage drive 914, hard drive 912 or communications interface 924.

In other embodiments, features of the disclosure are implemented primarily in hardware using, for example, hardware components such as Application Specific Integrated Circuits (ASICs) and programmable or static gate arrays or other state machine logic. Implementation of a hardware state machine so as to perform the functions described herein will also be apparent to persons skilled in the relevant art(s).

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any hardware mechanism for storing information in a form readable by a machine (e.g., a computing device). For example, a machine-readable medium (computer memory) may include read only memory (ROM); random access memory (RAM); magnetic disk storage media; optical storage media; flash memory devices; and other hardware implementations. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

In embodiments having one or more components that include one or more processors, one or more of the processors can include (and/or be configured to access) one or more internal and/or external memories that store instructions and/or code that, when executed by the processor(s), cause the processor(s) to perform one or more functions and/or operations related to the operation of the corresponding component(s) as described herein and/or as would appreciated by those skilled in the relevant art(s).

It is to be appreciated that the Detailed Description section, and not the Abstract section, is intended to be used to interpret the claims. The Abstract section may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for providing access to a Wireless Fidelity (Wi-Fi) network in the premises of a customer of service provider network services, the method comprising:
   receiving, at a customer premises equipment (CPE), a device request for Wi-Fi settings of a wireless network of the customer;
   communicating, to the service provider, the device request for the Wi-Fi settings of a wireless network of the customer, wherein the
   the service provider determines a most current instance of the Wi-Fi settings of the wireless network of the customer, and wherein the most current instance reflects changes made by the customer to one or more settings for the wireless network of the customer;
   receiving, at the CPE, a Quick Response (QR) code representing the most current instance of the Wi-Fi settings of the wireless network of the customer, wherein the QR code is based on at least a Wi-Fi Service Set Identification (SSID) and password associated with the wireless network of the customer;
   delivering the QR code to a television on a dedicated television channel;
   displaying a graphic representation of the QR code on the television on the dedicated television channel, the graphic representation of the QR code representing the most current instance of the Wi-Fi settings of the wireless network; and
   connecting one or more mobile devices to the wireless network of the customer based on a scanned instantiation of the graphic representation of the QR code.

2. The method of claim 1, wherein the device request is first received by a remote control associated with the television.

3. The method of claim 2, wherein the device request is first received by the television from a voice interaction with the remote control associated with the television.

4. The method of claim 1 further comprises displaying the graphic representation of the QR code as an overlay on a current television channel of the television.

5. The method of claim 1, wherein the most current instance reflects a change to a name of the wireless network, a change to a password of the wireless network or a change to both.

6. A system comprises:
   one or more processors; and
   a memory coupled to the one or more processors;
   wherein the one or more processors are configured to:
      receive, at a customer premises equipment (CPE), a device request for Wi-Fi settings of a wireless network of the customer;
      communicate to a service provider, the device request for the Wi-Fi settings of the wireless network of the customer, wherein the
      service provider determines a most current instance of the Wi-Fi settings of the wireless network of the customer, and wherein the most current instance reflects changes made by the customer to one or more settings for the wireless network of the customer;
      receive, at the CPE, a Quick Response (QR) code representing the most current instance of the Wi-Fi settings of the wireless network of the customer, wherein the QR code is based on at least a Wi-Fi Service Set Identification (SSID) and password associated with the wireless network of the customer;
      deliver the QR code to a television on a dedicated television channel;
      display a graphic representation of the QR code on the television on the dedicated television channel, the graphic representation of the QR code representing the most current instance of the Wi-Fi settings of the wireless network; and
      connect one or more mobile devices to the wireless network of the customer based on a scanned instantiation of the graphic representation of the QR code.

7. The system of claim 6, wherein the most current instance reflects a previous change to the Wi-Fi SSID, to the password or to both.

8. The system of claim 6, wherein the request is received from a remote control associated with the television.

9. The system of claim 8, wherein the request is based on a voice interaction with the remote control associated with the television.

10. The system of claim 8, wherein the displaying the QR code includes displaying as an overlay on a current channel.

11. A method for providing access to a Wireless Fidelity (Wi-Fi) network in the premises of a customer of service provider network services, the method comprising:
   receiving, at a customer premises equipment (CPE), a device request for Wi-Fi settings of a wireless network of the customer;
   communicating to the service provider, the device request for the Wi-Fi settings of the wireless network of the customer, wherein the service provider, determines a most current instance of the Wi-Fi settings of the wireless network of the customer, wherein the most current instance reflects changes made by the customer to one or more settings for the wireless network of the customer;

receiving, at the CPE, a Quick Response (QR) code representing the most current instance of the Wi-Fi settings of the wireless network of the customer, wherein the QR code is based on at least a Wi-Fi Service Set Identification (SSID) and password associated with the wireless network of the customer;

displaying a graphic representation of the QR code on a television on a television channel selected by a user, the graphic representation of the QR code representing the most current instance of the Wi-Fi settings of the wireless network; and connecting one or more mobile devices to the wireless network of the customer based on a scanned instantiation of the graphic representation of the QR code.

12. The method of claim 11, wherein the most current instance reflects a change to the Wi-Fi S SID, a change to the password associated with the customer premises equipment or a change to both.

13. The method of claim 12, wherein the device request is received from a remote control associated with the television.

* * * * *

UNITED STATES PATENT AND TRADEMARK OFFICE
CERTIFICATE OF CORRECTION

PATENT NO. : 11,962,842 B1
APPLICATION NO. : 17/137948
DATED : April 16, 2024
INVENTOR(S) : Singh et al.

It is certified that error appears in the above-identified patent and that said Letters Patent is hereby corrected as shown below:

In the Claims

In Column 13, Claim 1, Line 49, delete "the the" and insert -- the --, therefor.

In Column 15, Claim 12, Line 21, delete "S SID," and insert -- SSID, --, therefor.

Signed and Sealed this
Fourth Day of June, 2024

Katherine Kelly Vidal
*Director of the United States Patent and Trademark Office*